(12) United States Patent
Shao et al.

(10) Patent No.: US 7,288,197 B2
(45) Date of Patent: Oct. 30, 2007

(54) BIOLOGICAL MEMBRANE FILTRATION SYSTEM FOR WATER TREATMENT AND A WATER TREATMENT PROCESS

(75) Inventors: Hsin Shao, Hsinchu (TW);
Wang-Kuan Chang, Hsinchu (TW);
Ren-Yang Horng, Hsinchu (TW);
Ming-Jing Perng, Hsinchu (TW);
Ming-Chao Chang, Hsinchu (TW);
Wen-Yuang Tzou, Hsinchu (TW);
Yih-Chang Chen, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 225 days.

(21) Appl. No.: 11/097,178

(22) Filed: Apr. 4, 2005

(65) Prior Publication Data

US 2006/0131230 A1    Jun. 22, 2006

(30) Foreign Application Priority Data

Dec. 22, 2004  (TW)  .............................. 93139947 A

(51) Int. Cl.
*C02F 3/08* (2006.01)
(52) U.S. Cl. ...................... 210/615; 210/620; 210/151; 210/259
(58) Field of Classification Search ................ 210/605, 210/620, 615–618, 630, 150, 151, 252, 259
See application file for complete search history.

(56) References Cited

U.S. PATENT DOCUMENTS 3,966,599 A * 6/1976 Burkhead .................. 210/618
5,227,051 A * 7/1993 Oshima ..................... 210/137
5,449,453 A * 9/1995 Tang .......................... 210/108
5,707,514 A * 1/1998 Yamasaki et al. ........... 210/151
6,368,849 B1 * 4/2002 Norddahl .................... 435/262
6,627,082 B2 * 9/2003 Del Vecchio et al. ....... 210/636
6,752,921 B1 * 6/2004 Kulick, III .................. 210/138
2003/0159990 A1 * 8/2003 Collins et al. .............. 210/615
2006/0131230 A1 * 6/2006 Shao et al. .................. 210/601

FOREIGN PATENT DOCUMENTS

| EP | 1 484 287 A1 |   | 12/2004 |
|----|--------------|---|---------|
| JP | 6-285496     | * | 10/1994 |
| JP | 8-39062      | * | 2/1996  |
| JP | 10-314791    | * | 12/1998 |
| JP | P2001-334282 | * | 12/2001 |
| JP | P2002-1377   | * | 1/2002  |
| JP | P2003-53363  | * | 2/2003  |

* cited by examiner

Primary Examiner—Fred G. Prince
(74) Attorney, Agent, or Firm—Bacon Thomas PLLC

(57) ABSTRACT

The present invention discloses a biological membrane filtration wastewater treatment system including a porous biological filtration bed zone and a membrane separation zone. The porous biological filtration bed zone has the dual function of providing biological treatment and higher filtration rates, wherein a fixed bed or moving bed is utilized so that the porous biological filtration bed zone has the advantages of high loading rates, high removal efficiencies, high stability and ease of operation. The membrane separation zone utilizes a membrane filtration module to filter an effluent from the porous biological filtration bed zone, so that solid particles therein are separated and remain in the system. Therefore, a high quality of effluent is obtained.

6 Claims, 4 Drawing Sheets

BIOLOGICAL MEMBRANE FILTRATION SYSTEM FOR WATER TREATMENT AND A WATER TREATMENT PROCESS

FIELD OF THE INVENTION

The present invention relates to a novel biological membrane filtration water treatment system, which includes a porous biological filtration bed zone and a membrane separation zone.

BACKGROUND OF THE INVENTION

Membrane bioreactors (MBRs) are usually used in secondary treatment for removing COD, suspended solids (SS), and nitrogen-containing contaminants, etc. Due to the performance of biological treatment and membrane filtration, an MBR is capable of obtaining treated water quality that is close to a tertiary treatment level. Thus, an MBR is also suitable for use as a pre-treatment unit for wastewater reuse. At present, the more mature MBR units primarily belong to solid-liquid separation types, and usually use an ultrafiltration (UF) or micro-filtration (MF) membrane to concentrate biological sludge and obtain an effluent with excellent water quality.

The flux ($m^3/m^2$.day) of a membrane module is one of the most important control parameters for the MBR technique, and is related to the hydraulic retention time (HRT), volumetric loading, and transmembrane pressure of the membrane module. The flux of a membrane module is also an important factor in the installation and operating costs of a MBR system. In addition to SS characteristics and effluent quality, SS concentration has also effect on the flux of a membrane module. Although a higher concentration of SS indicates higher treatment efficiency, a higher concentration of sludge will also cause a reduction in the flux of an MBR, and an increase of the operating pressure thereof.

In US 2004-0079701 A1, the applicant of the present invention discloses a method of waste water/water treatment in a submerged membrane bioreactor. The bioreactor includes a tank containing a mixed liquor having microorganisms; porous carriers in the mixed liquors; and a filtration module immersed in the mixed liquor having a permeate side in fluid communication with the mixed liquor only through the filtration module. The method includes introducing an influent into the tank; applying a negative pressure source to the permeate side so that liquid in the tank penetrates the filtration module into the permeate side and flows out from the tank; and aerating the mixed liquor in the tank so that the porous carriers remain in contact with the filtration module, thus reducing fouling of the filtration module. Even though the above-mentioned patent application resolves a portion of the fouling problem, the application has its limitations. Since the concentrated sludge and the filtration module are located in the same reactor, it is difficult to maintain a high flux of water while simultaneously maintaining a high content of SS (a high concentration of microorganisms making degradation of contaminants easier). The disclosure in US 2004-0079701 A1 is incorporated herein by reference.

SUMMARY OF THE INVENTION

A main objective of the present invention is to provide a biological membrane filtration water treatment reactor capable of overcoming the restrictions of the conventional membrane filtration reactor, which is unable to maintain a high flux while maintaining a high content of SS.

In order to achieve the above-mentioned objective, the present invention proposes the concept of separating biological treatment from a solid-liquid separation procedure. A biological membrane filtration water treatment system includes a biological filtration bed zone and a membrane separation zone. The biological filtration bed zone uses porous carriers as biological media. Since such media have large surface areas with an increased capability of intercepting suspended solids (SS) in wastewater while providing space for adhesion, growth and propagation of microorganisms, a large quantity and specific groups of microorganisms can be accumulated for the convenience of achieving the objective of removing various contaminants. Since a biological filtration bed zone involves attached growth of microorganisms, the concentration of SS in the effluent can achieve a very low level, thereby greatly reducing the load associated with solid-liquid separation in a subsequent membrane separation zone. Thus, the flux and stability of the membrane filtration module are significantly increased, and clear treated water of good quality is produced. Furthermore, effective control of the fouling of the membrane filtration module provides reduction of the transmembrane pressure, energy consumption, and the frequency of backwash, thereby effectively prolonging the operational lifespan of the membrane filtration module, reducing the hydraulic retention time (HRT) of the treatment tank, reducing the volume of the membrane separation zone, and reducing construction, operational and maintenance costs.

The present invention provides the following advantages:
Increased efficiency of the treatment tank;
Simple solid-liquid separation for the sludge;
High functional stability with excellent effluent quality;
Applicable to wastewater with low concentration and operable under high hydraulic loading;
Reduced installation and operating costs.

BRIEF DESCRIPTIONS OF THE FIGURES

LEGENDS

Figure 1:
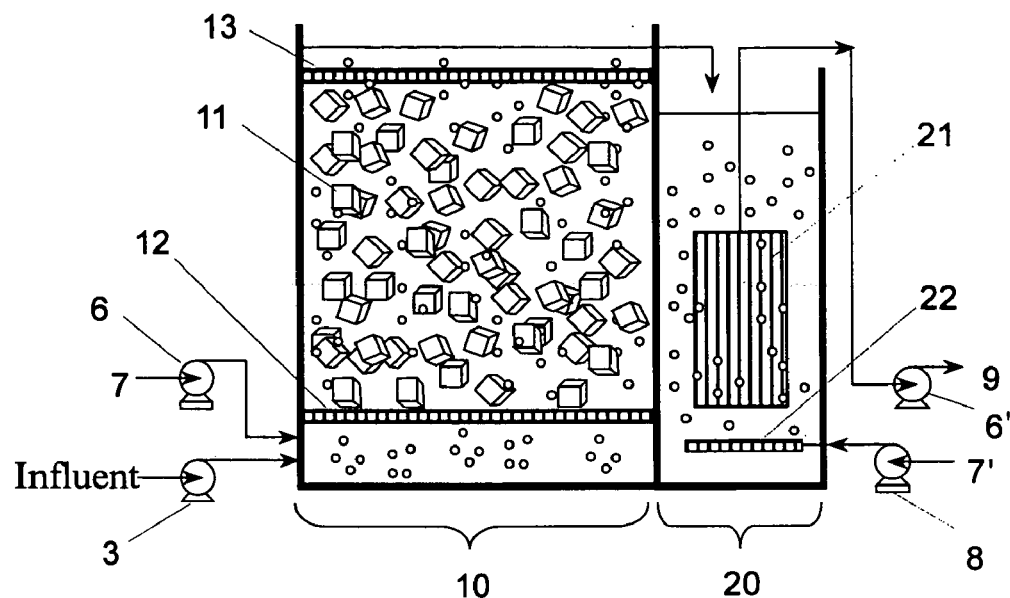
FIG. 1 is a schematic diagram of a biological membrane filtration water treatment system according to the present invention, wherein a biological filtration bed zone and a membrane separation zone are of an integrated configuration.

3 . . . influent pump 6,6' . . . blower 7,7' . . . air
8 . . . effluent pump 9 . . . effluent
10 . . . biological filtration bed zone 11 . . . porous biological carrier
12 . . . lower filtration screen 13 . . . upper filtration screen
20 . . . membrane separation zone 21 . . . membrane filtration module
22 . . . aeration device

DETAILED DESCRIPTION OF THE INVENTION

The present invention discloses a biological membrane filtration water treatment system, which comprises a biological filtration bed zone tank and a membrane separation zone tank, wherein the biological filtration bed zone tank comprises a microorganism-containing mixed liquor and a plurality of porous carriers in the mixed liquor; and the membrane separation zone tank comprises treatment water formed by the effluent from the biological filtration bed zone tank, and a filtration module immersed below the water surface of the treatment water, wherein the filtration module has a permeation side, and the treatment water and the permeation side form a fluid communication only through the filtration module.

Preferably, the biological filtration bed zone tank further comprises an aeration device installed at the base of the biological filtration bed zone tank. More preferably, the biological filtration bed zone tank further comprises a support screen installed in the biological filtration bed zone tank and located above the aeration device for preventing the plurality of porous carriers from coming close to the base of the biological filtration bed zone tank.

Preferably, the biological filtration bed zone tank further comprises a filtration screen installed in the biological filtration bed zone tank and above the plurality of porous carriers for preventing the plurality of porous carriers from entraining out of the biological filtration bed zone tank along with the effluent.

Preferably, the membrane separation zone tank further comprises an aeration device installed at the base of the membrane separation zone tank.

Preferably, the porous carrier is made of an inorganic or organic porous material. More preferably, the porous carrier is made of polymer foam.

Preferably, the filtration module comprises a microfiltration (MF) membrane, a ultrafiltration (UF) membrane, a ceramic membrane, a non-woven fabric membrane, a woven fabric membrane, a porous screen-like construction, or a mixture thereof.

The present invention also discloses a water treatment method by using the biological membrane filtration water treatment system of the present invention, which comprises introducing an influent into the biological filtration bed zone tank and retaining the influent in the biological filtration bed zone tank for a certain period of time before it flows out of the biological filtration bed zone tank, wherein at least a portion of the contaminants in the influent are degraded by microorganisms while being retained in the biological filtration bed zone tank; introducing an effluent from the biological filtration bed zone tank into the membrane separation zone tank; and applying a negative pressure source on the permeation side of the filtration module so that treatment water in the membrane separation zone tank permeates the filtration module and is discharged from the permeation side, such that permeation water discharged from the membrane separation zone tank contains a less amount of contaminants than the influent.

Preferably, the porous carriers are operated in a fixed bed manner or a moving bed manner, and wherein microorganisms or suspended solids are intercepted or attached on the porous carriers to undergo biological degradation reactions for the contaminants.

Preferably, the biological filtration bed zone tank is operated in an aerobic, anoxic, or anaerobic manner.

The term "water treatment" used in the present invention generally means a treatment of water or wastewater from tap water, municipal sewage, industrial wastewater and other sources.

Figure 2:
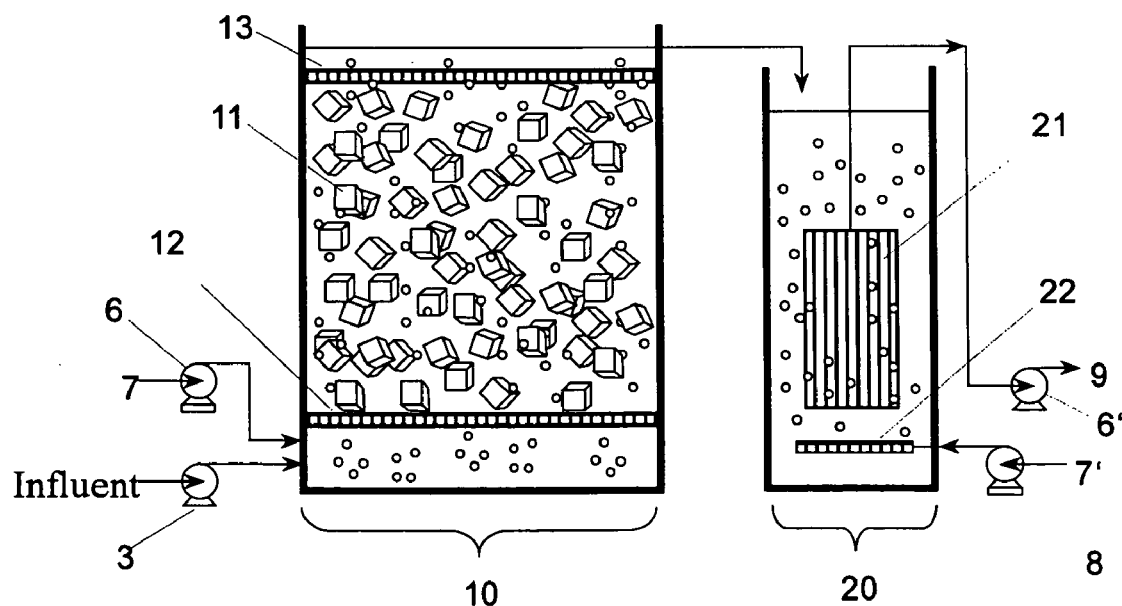
FIG. 2 is a schematic diagram of a biological membrane filtration water treatment system according to the present invention, wherein the biological filtration bed zone and the membrane separation zone are of a separated-tank-type configuration.

A biological membrane filtration water treatment system according to the present invention is a novel biological wastewater treatment system combining a biological filtration bed zone with a membrane separation zone, which includes an integrated configuration and a separated-tank-type configuration, as shown in FIGS. 1 and 2, respectively.

Influent is pumped into a biological filtration bed zone reactor 10 by an inlet pump 3; air or oxygen 7 is pumped into an aeration device (not shown in the figure) at the bottom of the biological filtration bed zone reactor 10 by a blower 6 to provide oxygen required by the biological treatment system in the biological filtration bed zone reactor 10. The gas 7 can also be hydrogen, nitrogen or carbon dioxide for an anoxic microorganism system, or nitrogen, methane or marsh gas for an anaerobic microorganism system. The biological filtration bed zone reactor 10 according to the present invention has porous biological carriers 11 made of inorganic or organic porous materials, e.g. ceramics, polymer foam, etc. The porous biological carrier 11 has a large surface area for increasing the capability of intercepting suspended solids (SS) in wastewater and for providing surface area for adhesion, growth and propagation of microorganisms. Thus, large quantities, and specific groups, of microorganisms accumulate for the benefit of achieving the objective of removing various contaminants. A lower filtration screen 12 is mounted at a location elevated from the base of the biological filtration bed zone reactor 10 at a specified height to support the porous biological carriers 11 and prevent it from sinking to the base. An upper filtration screen 13 is mounted at a location spaced from the top of the biological filtration bed zone reactor 10 to provide a specified clearance to prevent the porous biological carriers 11 from entraining out of the biological filtration bed zone reactor 10.

Effluent flowing from the top of the biological filtration bed zone reactor 10 is introduced into a membrane separation zone tank 20 that has a membrane filtration module 21 installed therein. A blower 8 is used to pump air or oxygen 7' into an aeration device 22 at the base of the reactor 20 for providing the oxygen required for a further biological treatment. The gas 7' can also be hydrogen, nitrogen or carbon dioxide for an anoxic microorganism system, or nitrogen, methane or marsh gas for an anaerobic microorganism system. The permeate 9 (i.e. effluent) is pumped out by an effluent pump 6'.

The present invention provides the advantages of increased treatment tank efficiencies, meeting effluent standards, reduced secondary contamination, simple solid-liquid separation, and a high treatment stability, and is particularly suited for operation under a high hydraulic load, which reduces installation and operating costs, and fully complies with current demands in the industry.

A biological membrane filtration water treatment system according to the present invention may be categorized as an advanced biological treatment technique, based upon the features of the invention in the treatment of wastewater with low concentration.

Figure 3:
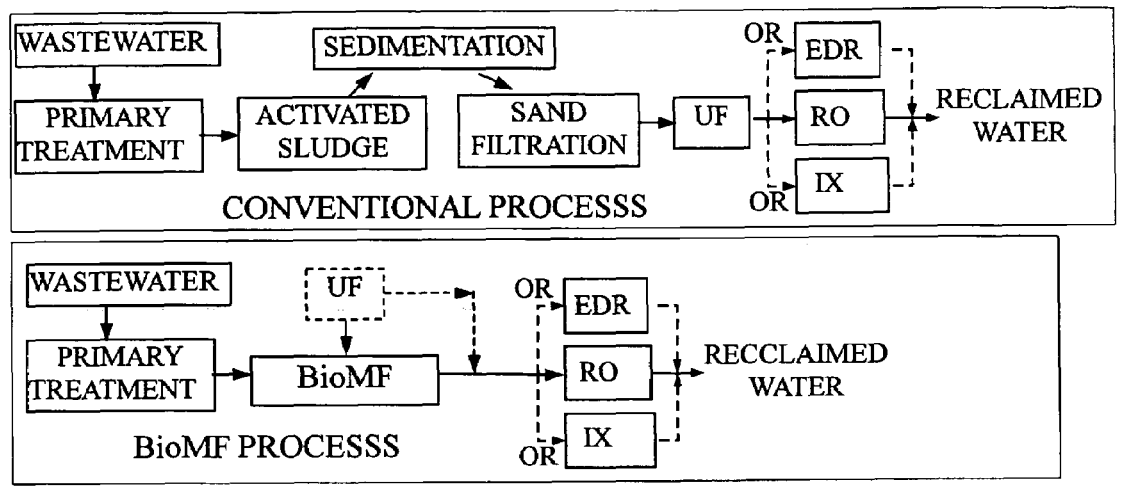
FIG. 3 is a block diagram for a biological membrane filtration water treatment process according to the present invention, and a block diagram for a conventional treatment process.

In comparison with a conventional activated sludge treatment process, a treatment technique according to the present invention obviously has a greatly simplified treatment process, as shown in FIG. 3. The quality of water treated by a technique according to the present invention is comparable to the quality of water after sand filtration and UF filtration according to a conventional activated sludge treatment process.

A technique according to the present invention is applicable for secondary biological treatment in removing COD from wastewater in order to ensure the effluent is in compliance with discharge standards, or enable the effluent to be reclaimed as part of a water recycle system, and is suitable for serial connection with a secondary biological treatment system for removing organic contaminants in wastewater that are difficult to be degraded in order to reduce the cost of tertiary treatment. Furthermore, a technique according to the present invention is also applicable to the pre-treatment of raw water in tap water treatment for removing organic contaminants, ammonia nitrogen, nitrate nitrogen, etc., and on the treatment of surface water and groundwater for removing organic contaminants, nitrogen-containing contaminants, etc. contained therein.

The present invention can be further understood by the following examples, which are for illustrative purposes only and which are not intended to limit the scope of the present invention.

Examples and Controls

A biological membrane filtration (BioMF) method according to the present invention and a membrane bioreactor (MBR) according to a conventional technique are compared for the functions and results thereof, and are explained in the following in terms of material, apparatus, method, functions, and results.

(1) Material, Apparatus, and Method

Experimental tests were primarily carried out using the wastewater from a chemical engineering research facility to investigate and compare the invention method with a conventional MBR method. The device arrangement of a pilot plant adopted by the example is shown in FIG. 1, and included an inlet pump, an outlet pump, a flowmeter, a BioMF reactor, an air compressor, various tanks, etc., wherein a rectangular BioMF reactor was made of acrylics with an effective volume of 24 L, and wherein 16 L was for a biological filtration bed region, and the remaining 8L was for a membrane separation region.

About 70% by volume of the biological filtration bed region was filled with porous carriers, which are compressible polyurethane (PU) foam carriers. The carriers were fan-shaped, and each carrier particle had a diameter of 2.2 cm, a thickness of 2 cm, a volume of 4.5 cm$^3$, and basic properties as indicated in the following table:

| Density | Tensile strength | Elongation |
|---|---|---|
| 28 ± 5 (kg/m$^3$) | 0.8~0.84 (kg/cm$^2$) | 240%~250% |

A membrane filtration module installed in a membrane separation zone included a set of vacuum gauge and a tubular peristaltic pump, together with a set of air flow meters, for performing aerated mixing and oxygen supply through the aeration head at the base of the tank. The membrane filtration module utilized a membrane filtration material developed by the applicant of the present invention, and was a non-woven fabric material with open pores and made of a polyethylene terephthalate (PET) material having an average pore size of 20 μm. The membrane filtration module included a square case and two layers of sheet-like structures fastened within the square case, wherein a clearance of 2 mm was formed between the two layers of the sheet-like structures as a channel for the trans-membrane water flow, and a support structure was installed in the channel. The periphery of the square case was sealed, and only an effluent tube was connected to the channel. The surface area (filtration area) of the sheet-like structures on the two sides was about 855 cm$^2$ in total.

(2) Functions and Results

The functions and results of a BioMF process according to the present invention and a conventional MBR process separately compared the flux of the membrane filtration module, the transmembrane pressure (TMP), the COD removal efficiency, etc.

1. Comparison in Flux

Figure 4:
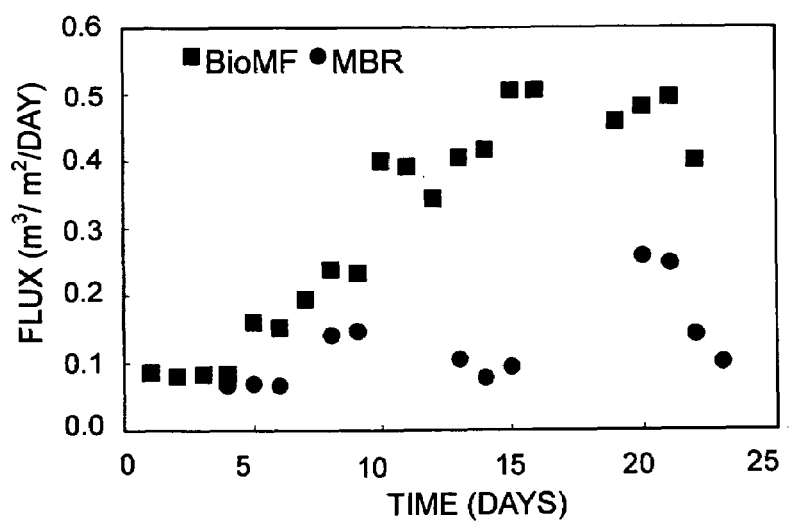
FIG. 4 is a graph of effluent flux vs. time, wherein a circle represents the value for a conventional membrane bioreactor process (MBR), and a square represents the value for a BioMF process according to the present invention.

For the experiment, the variations of the flux of the membrane filtration modules for the BioMF and the MBR processes are shown in FIG. 4. During the initial period after the experiment started, the flux increased gradually from a small value to a larger value. After 15 days, the flux for the BioMF process was about 0.4~0.5 m$^3$/m$^2$.day, and the flux for the MBR process was about 0.2 m$^3$/m$^2$.day. The flux for the BioMF process was obviously superior to the flux for the MBR process. In other words, the membrane module for a BioMF process could be made smaller, leading to a lower initial installation costs.

2. Comparison of Transmembrane Pressure

Figure 5:
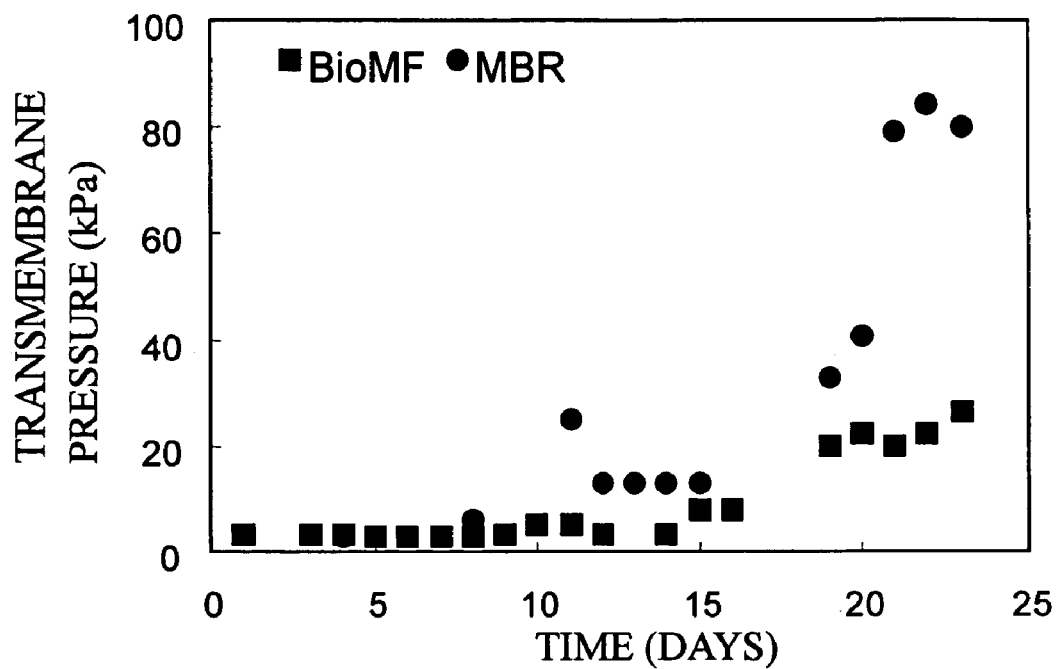
FIG. 5 is a graph of transmembrane pressure vs. time, wherein a circle represents the value for a conventional membrane bioreactor process (MBR), and a square represents the value for a BioMF process according to the present invention.

For the experiment, the variations of the transmembrane pressure of the membrane filtration modules for the BioMF and the MBR processes are shown in FIG. 5. During the initial period after the experiment started, the transmembrane pressure increased gradually from a small value to a larger value, with a maximum pressure of about 20 kPa (equivalent to 0.2 kg/cm$^2$) for the BioMF process, while the value exceeded 80 kPa (equivalent to 0.8 kg/cm$^2$) for the MBR process. The transmembrane pressure of a BioMF process was obviously lower than that of the MBR process. The electric power-associated costs are therefore certainly also lower for the present invention.

3. Comparison of COD Removal Efficiency

Figure 6:
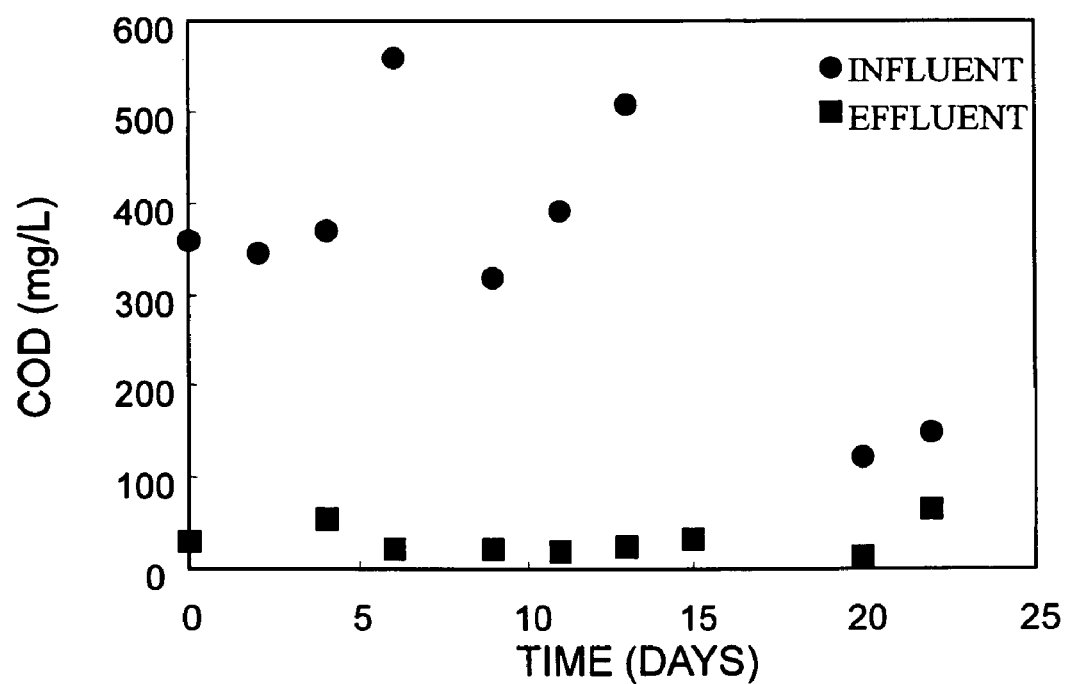
FIG. 6 is a graph of effluent COD and influent COD vs. time for a biological membrane filtration water treatment process according to the present invention.

FIG. 6 indicates the variation of COD for the influent and effluent water of the BioMF process during the experiment, wherein the COD concentration range for the influent was about 100~600 mg/L, and the COD concentration range for the effluent was rather stable at about 15~60 mg/L.

Figure 7:
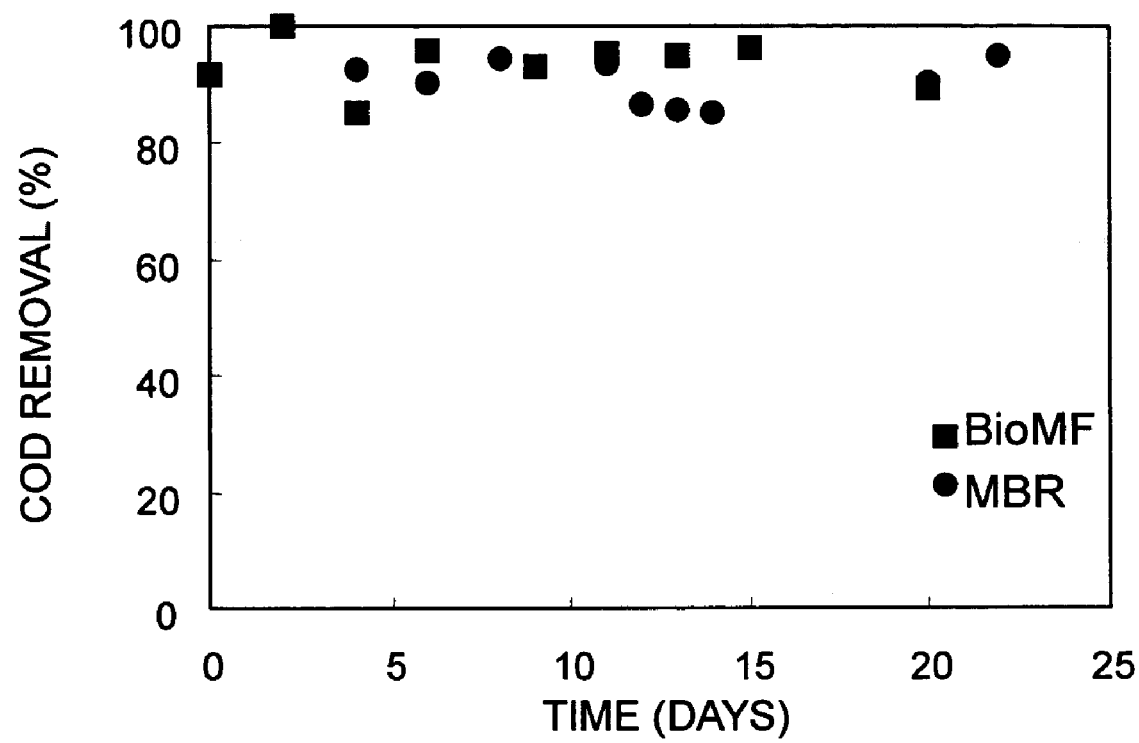
FIG. 7 is a graph of COD removal rates vs. time, wherein a circle represents the value for a conventional membrane bioreactor process (MBR), and a square represents the value for a BioMF process according to the present invention.

From FIG. 7, comparing the COD removal percentage during the experiment for the BioMF process and the MBR process, the COD removal percentage for the BioMF process is capable of exceeding 90%, which was significantly superior to that of the MBR process (with an average COD removal percentage of about 85%).

The above experimental results show that a biological filtration bed zone according to the present invention can increase the effluent flux of a conventional membrane bioreactor, reduce its transmembrane pressure, and increase its COD removal efficiency.

The invention claimed is:

1. A biological membrane filtration water treatment system, which comprises a biological filtration bed zone tank and a membrane separation zone tank, wherein the biological filtration bed zone tank comprises a microorganism-containing mixed liquor and a plurality of porous carriers in the mixed liquor; and the membrane separation zone tank comprises treatment water formed by the effluent from the biological filtration bed zone tank, and a filtration module immersed below the water surface of the treatment water, wherein the filtration module has a permeation side, and the treatment water and the permeation side form a fluid communication only through the filtration module, wherein the biological filtration bed zone tank further comprises an aeration device installed at the base of the biological filtration bed zone tank;

a support screen installed in the biological filtration bed zone tank and located above the aeration device for preventing the plurality of porous carriers from coming close to the base of the biological filtration bed zone tank; and, a filtration screen installed in the biological filtration bed zone tank and above the plurality of porous carriers for preventing the plurality of porous carriers from entraining out of the biological filtration bed zone tank along with the effluent.

2. The biological membrane filtration water treatment system as claimed in claim 1, wherein the membrane separation zone tank further comprises an aeration device installed at the base of the membrane separation zone tank.

3. The biological membrane filtration water treatment system as claimed in claim 1, wherein the porous carrier is made of an inorganic or organic porous material.

4. The biological membrane filtration water treatment system as claimed in claim 1, wherein the porous carrier is made of polymer foam.

5. The biological membrane filtration water treatment system as claimed in claim 1, wherein the filtration module comprises a microfiltration (MF) membrane, an ultrafiltration (UF) membrane, a ceramic membrane, a non-woven fabric membrane, a woven fabric membrane, a porous screen-like construction, or a mixture thereof.

6. A biological membrane filtration water treatment system, which comprises a biological filtration bed zone tank and a membrane separation zone tank, wherein the biological filtration bed zone tank comprises a microorganism-containing mixed liquor and a plurality of porous carriers in the mixed liquor; and the membrane separation zone tank comprises treatment water formed by the effluent from the biological filtration bed zone tank, and a filtration module immersed below the water surface of the treatment water, wherein the filtration module has a permeation side, and the treatment water and the permeation side form a fluid communication only through the filtration module, wherein the biological filtration bed zone tank further comprises an aeration device installed at the base of the biological filtration bed zone tank;

a support screen installed in the biological filtration bed zone tank and located above the aeration device for preventing the plurality of porous carriers from coming close to the base of the biological filtration bed zone tank;

a filtration screen installed in the biological filtration bed zone tank and above the plurality of porous carriers for preventing the plurality of porous carriers from entraining out of the biological filtration bed zone tank along with the effluent; and, wherein the filtration module comprises a non-woven fabric membrane.

* * * * *